United States Patent

Thomas

[11] Patent Number: 6,161,327
[45] Date of Patent: Dec. 19, 2000

[54] DATA ACQUISITION APPARATUS AND SYSTEM FOR FLYING INSECT LIGHT TRAPS

[76] Inventor: Abey C. Thomas, 11288 Ventura Blvd., #707, Studio City, Calif. 91604

[21] Appl. No.: 09/059,347

[22] Filed: Apr. 13, 1998

[51] Int. Cl.$^7$ ............................................. A01M 1/14
[52] U.S. Cl. ................................................ 43/115; 43/114
[58] Field of Search .............................. 43/114, 115, 116, 43/117, 118, 136, 113; 422/343; 40/661, 361; 434/324; 353/45; 235/89 R, 488, 495; 73/861.41, 864.71, 864.74

[56] References Cited

U.S. PATENT DOCUMENTS

| | | | |
|---|---|---|---|
| 391,014 | 10/1888 | Bosse | 43/114 |
| 836,634 | 11/1906 | Corbett | 43/115 |
| 988,003 | 3/1911 | Lord | 43/114 |
| 1,165,251 | 12/1915 | Harris | 43/115 |
| 1,622,591 | 3/1927 | Killion | 43/116 |
| 2,249,718 | 7/1941 | Griness | 43/114 |
| 3,816,956 | 6/1974 | Sekula | 43/114 |
| 4,425,733 | 1/1984 | Ammon et al. | 43/115 |
| 4,829,702 | 5/1989 | Silvandersson | 43/114 |
| 4,867,731 | 9/1989 | Willard et al. | 449/2 |
| 4,973,254 | 11/1990 | Bracconier | 434/324 |
| 5,228,574 | 7/1993 | Rogers | 206/494 |
| 5,353,542 | 10/1994 | Vaudry | 43/113 |
| 5,425,197 | 6/1995 | Smith | 43/113 |
| 5,577,342 | 11/1996 | Johnson et al. | 43/114 |
| 5,628,142 | 5/1997 | Kitterman et al. | 43/114 |

FOREIGN PATENT DOCUMENTS

| | | | |
|---|---|---|---|
| 2468305 | 5/1981 | France | 43/114 |
| 180436 | 2/1906 | Germany | 43/116 |
| 3193979 | 8/1988 | Japan | 43/114 |
| 16529 | of 1893 | United Kingdom | 43/114 |
| 310 | of 1902 | United Kingdom | 43/114 |

*Primary Examiner*—Michael J. Carone
*Assistant Examiner*—Son T. Nguyen
*Attorney, Agent, or Firm*—Allan M. Shapiro

[57] ABSTRACT

The data acquisition film medium is a gridwork of lines applied to read the distribution and population of insects captured on sticky material on a substrate. The data acquisition gridwork of lines may be applied to the substrate under the sticky material or may be applied to a separate transparent data acquisition film which is applied over the sticky material and insects captured thereon after use of the substrate with its sticky material. The separate transparent data acquisition medium may be in panels to cover the sticky material on capture glueboards, on either one side or both sides of the glueboard, may be in bag form for receiving the glueboards, may be on a roll with tear-off edge, may be wrapped around a single-sided or double-sided glueboard, or may be a long length of film to apply onto a long length of substrate carrying sticky material in an advancing manner in an insect light trap. The gridwork of lines aids the observer in acquiring data therefrom by helping count the captured insect population by numbers and species.

9 Claims, 3 Drawing Sheets

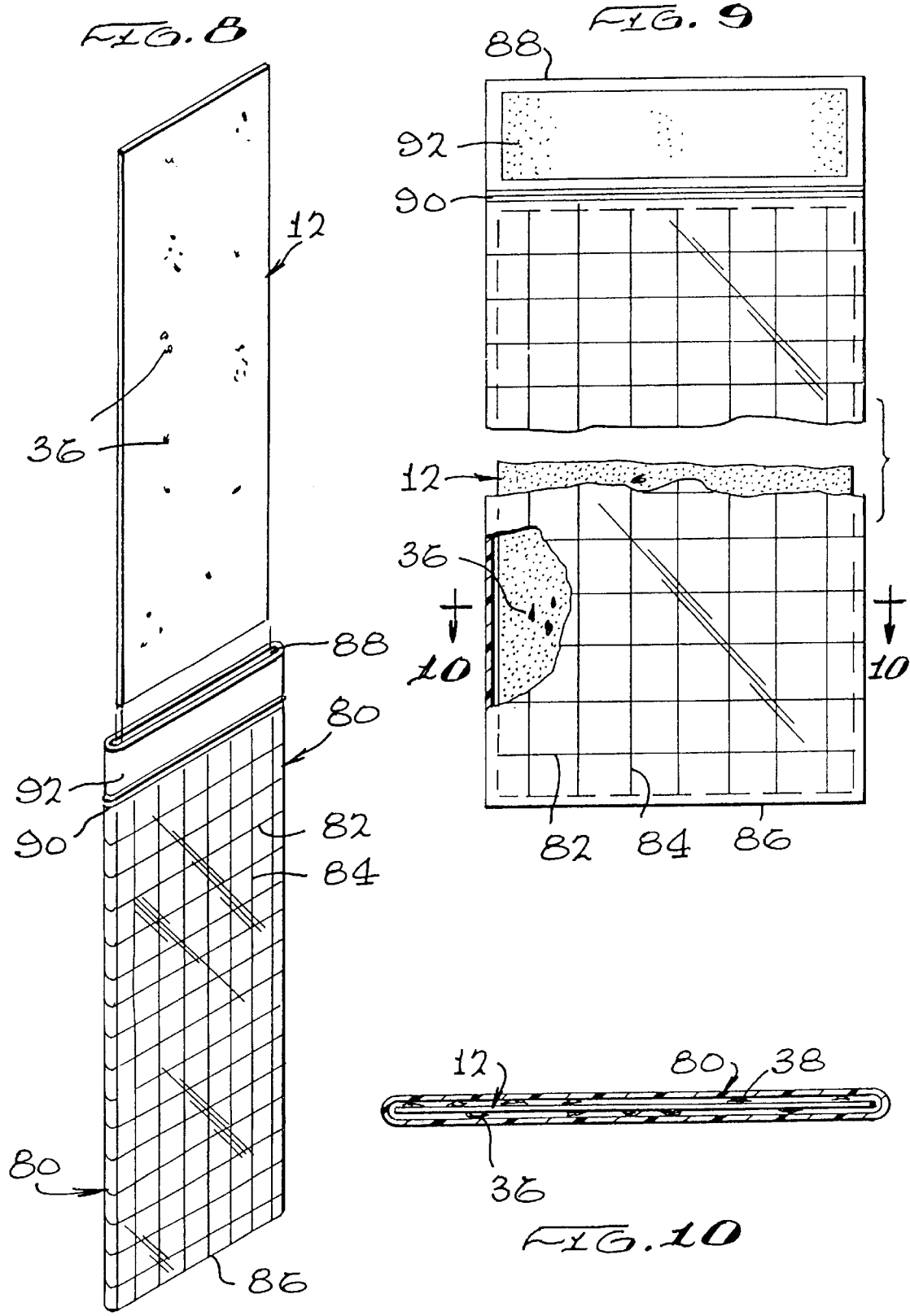

DATA ACQUISITION APPARATUS AND SYSTEM FOR FLYING INSECT LIGHT TRAPS

FIELD OF THE INVENTION

This invention is directed to a data acquisition apparatus and system by which particular flying insects attracted to a flying insect light trap are retained for identification and counting.

BACKGROUND OF THE INVENTION

Over the years a number of flying insect traps have come into use. Insects are attracted to the traps by various attractants such as color, light and/or scent. The attracted insects are then captured and/or killed by various means. Various traps have used systems of baffles, fans, insecticides, glueboards, glue films, electrocution, heat lamps and liquids. Such traps did not provide a convenient means for identification of various insects, counting the total number of insects and determining the different kinds of insects within the total count and the number of insects of each kind.

While the production of food for human consumption in the United States has been regulated and has been considered quite safe, modern methods of hazard analysis are becoming applied to the production of food. The present effort at hazard analysis includes its commitment to "science-based decision making" that will improve food safety.

Pest control is a crucial component in the prevention of microbiological contamination. The hazard analysis quality standards and requirements for monitoring and record-keeping will enter the field of flying insect contamination and will affect pest management strategy. It is expected that food processing organizations will find their operations subject to monitoring and record-keeping. It is expected to be necessary to document infestation levels with insect catch counts to verify that critical levels are not being exceeded. Species-specific monitoring of insect contamination is expected to be required to permit pest management strategies to be most effective in limiting food contamination during the production, processing and storage activities.

SUMMARY OF THE INVENTION

In order to aid in the understanding of this invention, it can be stated in essentially summary form that it is directed to a counting grid of rows and columns used in association with a glueboard or glue film to facilitate tallying the number and types of flying insects captured on the glueboard or film in a flying insect light trap.

It is thus a purpose and advantage of this invention to provide an improved flying insect capture medium for use with a flying insect light trap so that the light trap not only captures the insects but the improved capture medium facilitates the monitoring, capture rate determination, tallying and record-keeping of the flying insect catches.

It is a further purpose and advantage of this invention to provide an economic means whereby present day insect light traps can be employed to catch insects and the data medium used therewith preserves the state and concentration of insects so that, at a later time, they may be tallied.

It is a further purpose and advantage of this invention to provide economic means by which data can be acquired with respect to the numbers and types of insects which are trapped by an insect light trap.

The features of the present invention which are believed to be novel are set forth with particularity in the appended claims. The present invention, both as to its organization and manner of operation, together with further purposes and advantages thereof, may be understood best by reference to the following description, taken in conjunction with the accompanying drawings.

BRIEF DESCRIPTION OF THE DRAWINGS

FIG. 8 is an exploded isometric view of a double-sided glueboard with another preferred embodiment of a data acquisition film medium in accordance with this invention.

FIG. 9 is an enlarged plan view of the glueboard and data acquisition film medium of FIG. 8, partly broken away and sectioned.

FIG. 10 is a further enlarged sectional view taken generally along line 10—10 of FIG. 9.

DESCRIPTION OF THE PREFERRED EMBODIMENTS

Figure 1:
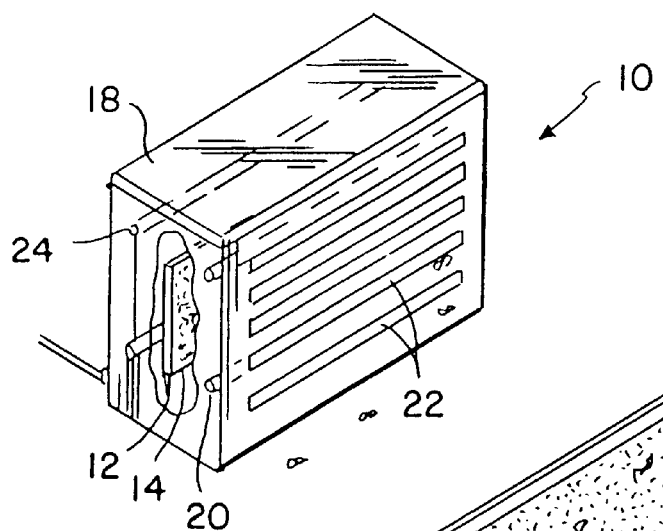
FIG. 1 is an isometric view, partly broken away, of an insect light trap which utilizes a glueboard for use with a data acquisition medium of this invention.

A flying insect light trap of conventional design is indicated generally at 10 in FIG. 1. It contains therein a board 12 which, for example, is of generally rectangular configuration and is coated on preferably both sides with sticky material.

Figure 2:
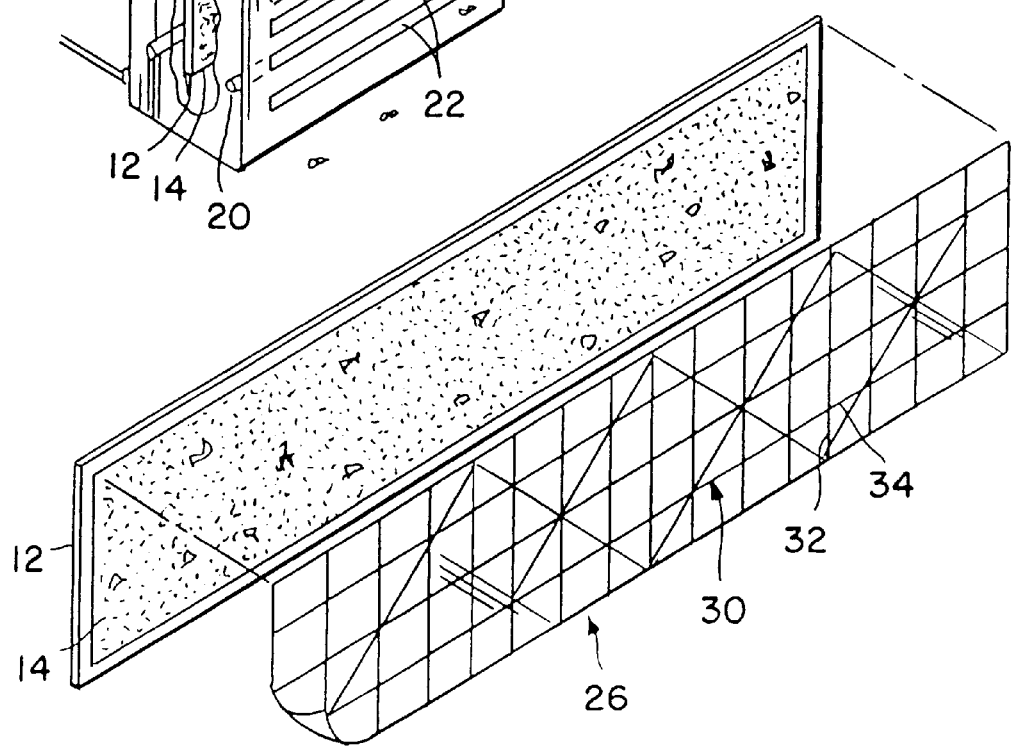
FIG. 2 is an isometric view of the glueboard as used in the trap of FIG. 1, shown with captured insects and removed from the trap, with an exploded isometric view of a preferred embodiment of the data acquisition medium in accordance with this invention about to be applied to the glueboard.
Figure 3:
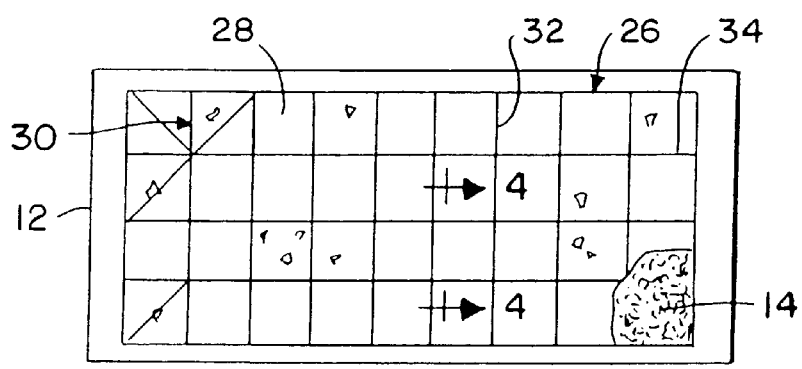
FIG. 3 is a schematic plan view of the glueboard with the data acquisition medium of FIG. 2 attached thereto.
Figure 4:
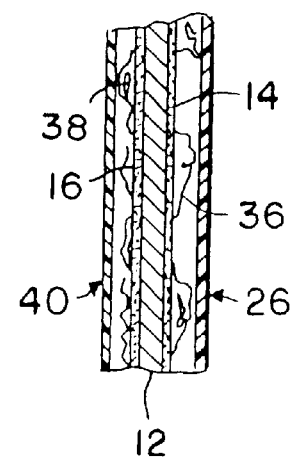
FIG. 4 is an enlarged section as seen generally along line 4—4 of FIG. 3, with parts broken away, showing a double-sided glueboard with data acquisition media on both sides.

FIGS. 1, 2 and 3 show the sticky material 14 on only the front side of the board 12, while FIG. 4 shows the double-sided board with sticky material 16 on the rear side. The board 12 is self-supporting material, such as cardboard. The sticky material is suitable for capturing flying insects when they land on it. The board 12 is thus considered a glueboard. Light trap 10 has a lid 18 which, when opened, permits the glueboard to be removed and replaced. The insect light trap 10 has means for attracting insects, such as incandescent or fluorescent light tubes 20. The light tubes generally are coated with an ultra-violet (UV) coating which preferably causes emission of light in the UVA band at about 365 nanometers wavelength, generally known for maximized attraction of flying insects. Non-UV light can be used when reliance on phototropic effects is justified. When the glueboard is one-sided, i.e., has sticky material 14 on only the front side, the light tubes 20 need be only in the front portion of the trap. The housing of the insect light trap has a series of front slots 22 which form a grilled opening to permit the entrance of flying insects so that they have access to the front side of the glueboard 12. The front, sticky side of the glueboard faces the front slots 22. When the glueboard is double-sided, rear lights 24 may be used, and rear slots (not shown) similar to the front slots 22 form a grilled opening for access to the rear side of the glueboard 12. The slots are designed for maximum access by the insects and minimum view of the glueboard by persons in the vicinity. This latter feature is to protect the sensibilities of those near the trap, so they have a minimized view of the captured insects, although there are many differently configured insect light traps which can employ glueboards for use in the system of this invention. In addition to light, other means such as odor and/or color can be employed to attract the insects to the trap and to the glueboard. FIG. 2 shows the glueboard with a plurality of insects captured thereon. For convenience of illustration, only a few insects are indicated although, in practice, large numbers of insects may be trapped from time to time.

The data acquisition film medium of this invention is indicated generally at 26 in FIGS. 2 and 3. It comprises transparent flexible film material 28, which is transparent synthetic polymer composition material. The material may be of the self-clinging type, such as Saran-Wrap. The medium 26 has a grid 30 marked thereon. The grid is preferably formed of regularly spaced vertical lines 32 and regularly spaced horizontal lines 34. The spacing is preferably the same to define squares. The medium 26 is sized so that it covers the sticky material 14 on the board 12. Thus, after the glueboard 12 has been utilized to capture flying insects, it is removed from the light trap 10. Thereupon, the data acquisition film medium 26 is placed over the sticky side. The application of the film medium 26 over the glueboard accomplishes several functions. Firstly, it prevents the insects from falling off the glueboard to contaminate the surroundings. By preventing the falling off of insects, it maintains basic information because the user can be assured that all of the insects have been retained thereon for counting. The placement of the film medium over the glueboard prevents contamination of the handler from the glue and also maintains the insect capture status of the glueboard so that the status is the same as when the film medium was placed thereon. Thus, later insect accumulation is not a possibility, since such occurrence would reduce the accuracy of the data acquired. Placement of the transparent film thus maintains the status of the insect distribution and concentration on the glueboard. In addition, the grid 30 aids in the counting of the captured insects both in numbers and species. Each grid area can be counted individually and accuracy is enhanced. On the other hand, should insects be fairly evenly distributed on the glueboard, only a representative number of grid squares need be counted and an appropriate multiplier be used to estimate the total number of insects captured. The multiplier is the result of the total number of grid squares divided by the number of counted grid squares. Thus, the film medium is data acquisition apparatus to obtain aid in counting the number and types of flying insects caught in the light trap.

As seen in FIG. 4, the board 12 is coated with sticky material on both sides, with sticky material 14 and 16 shown on the front and rear, respectively, of the board 12. Insects such as at 36 are caught on the sticky capture material on the front of the glueboard and insects such as at 38 are caught on the sticky capture material on the back side of the glueboard. Thereupon, the glueboard is removed from the trap and replaced with a new glueboard. At this point, the data acquisition film medium 26 is placed over the insects and the sticky capture material on the front side of the board, and data acquisition film medium 40 is placed over the insects and the sticky capture material on the rear side of the board. The data acquisition film mediums 26 and 40 are the same. In this double-sided glueboard case, the film mediums 26 and 40 may consist of a single piece, folded over onto both sides of the board. After application of the mediums, the glueboard 12 is safe for handling, counting insects and storage for later evaluation.

Figure 5:
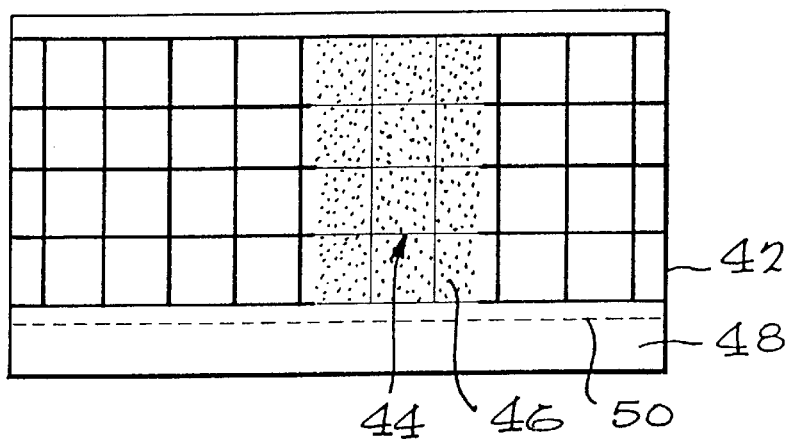
FIG. 5 is a plan view of another preferred embodiment of this invention.

The board 42 shown in FIG. 5 is sized to fit into a suitable insect light trap. It may be single-sided or double-sided depending upon the character of the insect light trap in which it will be used. Presuming it is double-sided, the other side will be the same as the visible side, which is described below. A printed counting grid 44 is applied to the board before the application of sticky material 46. The sticky material is sufficiently transparent so that the printed grid can be seen therethrough. This relationship is demonstrated in FIG. 5 by showing sticky material 46 on only a portion of the glueboard 42, with the printed grid 44 appearing in slightly lighter lines under the sticky material 46. After the board 42 is used in a flying insect light trap, it is removed and can immediately be read so that the captured insect population can be analyzed for numbers of species. If desired, a layer of clear protective material can be overlaid on the sticky material before or after the data is taken. The lower band 48 is a separate layer of paper attached by perforation line 50. The data with respect to date, time, captured insect population numbers and species may be entered onto the lower band 48. The lower band is then removed for safe-keeping and the board 42 thereupon may be discarded. This saves storage space. If the board 42 is double-sided, a similar lower band is provided thereupon for data taken from that other side of the board.

Figure 7:
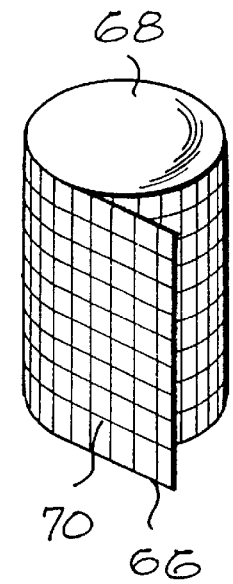
FIG. 7 is an isometric view of a data acquisition film medium in accordance with this invention.

The data accumulation apparatus thus far described has been in association with an insect light trap of the nature of trap 10, or a double-sided version thereof. Insect light trap 52 shown in FIG. 6 does not rely upon the fixed and periodically changed insect capture board. Instead, it has a supply roll 54 of flexible substrate material 56 which carries sticky material 58 on the front face thereof. The right side of the housing is open for the entry of flying insects and has insect attracting equipment therein, such as ultra-violet lights. The insects are captured on the sticky material in the same way as described above. The difference with insect trap 52 is that drive means 60 advances the flexible substrate material 56. It may be continuously advanced at a slow rate or, more commonly, may be periodically advanced to expose a new area of sticky material. The already exposed flexible substrate is wound up on takeup roll 62. Data entry device 64 includes a clock for applying chronological data and may apply marks to the flexible substrate material 56 so that each exposed panel can be separately identified as to date, time, length of exposure and other kinds of relevant data. In order to permit data to be acquired and the insects preserved in accordance with the present invention, the data acquisition film medium 66 is provided on roll 68 (see FIG. 7). The roll 68 is mounted in the flying insect light trap 52 to roll onto and cover the sticky material and the insects captured thereon. The data acquisition film medium 66 is a long strip of transparent material, such as synthetic polymer composition material transparent film. As seen in FIG. 7, it has a grid 70 thereon, preferably by printing, so that when it is applied over the captured insects on the sticky material, the same effects are achieved as described above in connection with the glueboard versions. Thus, the insect population with respect to quantity and type can be observed and data taken after the supply roll 54 is exhausted and the take-up roll 62 is removed from the trap. The used flexible substrate material 56 with its data acquisition film 66 thereon can be wound for storage and unwound for data-taking. Since the sticky material is covered with the data acquisition film medium 66, the used sticky-coated flexible substrate material can be safely handled without engaging the insects or the sticky material. In this way, data can be acquired and the material stored for later analysis.

Figure 6:
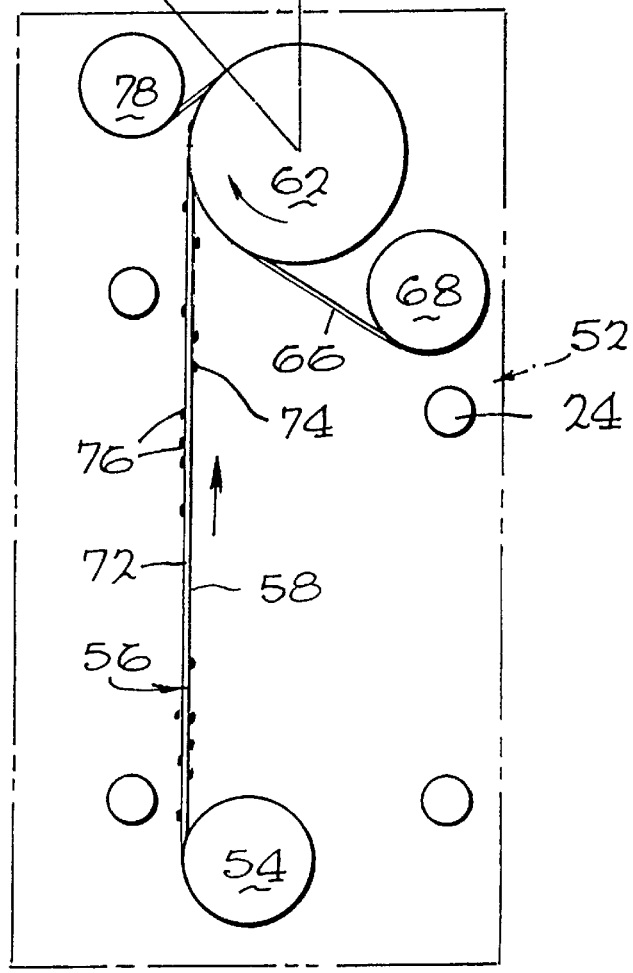
FIG. 6 is a schematic end view of a second version of a flying insect light trap, showing data acquisition film media used therein in accordance with this invention.

In addition to the above-described embodiment of the present invention, FIGS. 6 and 7 are used conveniently to illustrate another embodiment which is a double-sided version. When so used, the flexible substrate material 56 carries sticky material 72 on the rear face thereof so that flying insects can be captured on both front and rear faces, such captured insects being shown diagrammatically at 74 and 76, for instance. Another roll 78 of flexible transparent film material is used to cover the rear face and secure the captured insects as previously described. When the roll 68 bears a grid, such as grid 70, roll 78 is clear and gridless; if desired, the grid function can be interchanged between rolls 68 and 78. In this double-sided version, the flexible substrate material 56 is transparent so that the data analysis can be performed from either the front or rear when the takeup roll 62 later is unrolled. It should be noted that the flexible substrate material 56 may be either transparent or opaque when used in the single-sided version.

Referring to FIGS. 8, 9 and 10, there is seen the double-sided glueboard 12 previously described in connection with FIGS. 1–4. In this version of the data acquisition apparatus of this invention, there is provided a bag 80 of substantially transparent synthetic polymer composition material having a plurality of grid lines thereon. The horizontal grid lines, such as grid line 82, and the vertical grid lines, such as grid line 84, appear on both sides of the bag. For convenience of manufacture, both the horizontal and vertical grid lines may be printed in a continuous manner on the bag material before the bag material (normally on rolls) is placed into the conventional bag-making machinery. When finished, the bag 80 is provided with a closed bottom end 86, an open top end 88, a plastic zipper 90 for closing off the main body of the bag, and a data-receiving panel 92 at the upper end for the writing or otherwise imprinting of the desired data such as, initially, the date, time and site of board exposure and retrieval. Later, the insect types and numbers can be recorded on panel 92. The board 12, bearing the captured insects thereon, is inserted through the top end 88 of the bag until it rests on the bottom end 86 of the bag. It should be noted that the size of the bag preferably is related to the size of the glueboard 12. For instance, the main portion of the bag, i.e., the portion of the bag between the bottom end and the zipper, should approximate the length of the glueboard 12. Similarly, the width of the bag should approximate the width of the glueboard, noting, however, that the inside dimensions of the bag should be sufficiently greater than the outside dimensions of the glueboard with its adhered insects so that the insects are neither damaged nor displaced during the insertion of the glueboard into the bag. Once the glueboard has been inserted, it is preferred to lightly press the bag material against the sticky material, thereby assuring the retention of the captured insects on their capture sites on the glueboard. Then, the zipper is sealed and the data acquisition apparatus is complete.

This invention has been described in its presently contemplated best modes and embodiments and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A flying insect capture data acquisition apparatus comprising:
    a board sized to be placed into a flying insect light trap;
    visible grid lines on both sides of said board, said grid lines being straight, equally spaced, and substantially at a right angle with respect to each other; and
    sticky material on both sides of said board and over said grid lines, said sticky material being sufficiently sticky to capture flying insects and being sufficiently transparent to permit seeing of said grid lines so that, after said board is exposed to flying insects so that insects are captured in said sticky material, data relating to numbers and species of insects can be taken by observing insects with respect to said grid lines.

2. A flying insect capture data acquisition apparatus comprising:
    a flexible substrate carrying sticky material in a flying insect light trap, said substrate advancing from a supply roll to a takeup roll with exposure to flying insects therebetween so that the sticky material on the flexible substrate can capture flying insects;
    an elongated substantially transparent flexible film medium with visible grid thereon, said film medium having a transverse direction, said film medium being as wide in said transverse direction as said flexible substrate, said transparent flexible film medium with grid being attached to the sticky material before the flexible substrate material is wound up on the takeup roll so that said flexible substantially transparent film medium with grid is wound onto the sticky face of the flexible substrate material as it goes onto the takeup roll so that the takeup roll can be subsequently unrolled to acquire data related to the captured insect population by reference to said grid.

3. The data acquisition apparatus of claim 2 wherein said flexible substrate is transparent and has said sticky material on both sides thereof to capture flying insects, and
    further including a second elongated transparent flexible film medium for being attached to the other sticky material side so that said second film medium is wound onto the other sticky face of the flexible substrate material as it goes onto the takeup roll.

4. The data acquisition apparatus of claim 2 further including a clock for applying chronalogical data to said flexible substantially transparent film medium so that said chronalogical date data is available for acquisition when said takeup roll is unrolled for the visual acquisition of captured insect data therefrom.

5. The data acquisition apparatus of claim 2 wherein said grid comprises a first group of grid lines which are straight, parallel and equally spaced.

6. The data acquisition apparatus of claim 5 wherein said grid comprises a second group of grid lines which are straight, parallel and equally spaced.

7. The data acquisition apparatus of claim 6 wherein said first group of said grid lines and said second group of said grid lines are comprised of grid lines which are positioned substantially at a right angle with respect to each other.

8. A data acquisition apparatus comprising:
    a flying insect light trap substrate having insect-trapping sticky material on both sides thereof;
    a substantially transparent synthetic polymer composition material film medium having a plurality of grid lines thereon, a first group of said grid lines being spaced from each other and a second group of said grid lines angularly related to said first group of said grid lines, said film medium being sized and configured to overlie said insect trap substrate so that, after use of the insect trap substrate with insects captured in the sticky material, said film medium can overlie the sticky material on both sides of said substrate to cover the sticky material and retain the insects captured therein so that said grid lines can aid in observing and counting the type and numbers of insects captured in the sticky material.

9. The data acquisition apparatus of claim 8 wherein said film medium is in the form of a bag having a sealable opening for receiving said substrate after use, said bag encompassing said substrate.

\* \* \* \* \*